Dec. 2, 1958   J. B. WILLIS   2,863,060
COMPOSITION ANALYZER UTILIZING RADIATION
Filed June 20, 1955   3 Sheets-Sheet 1
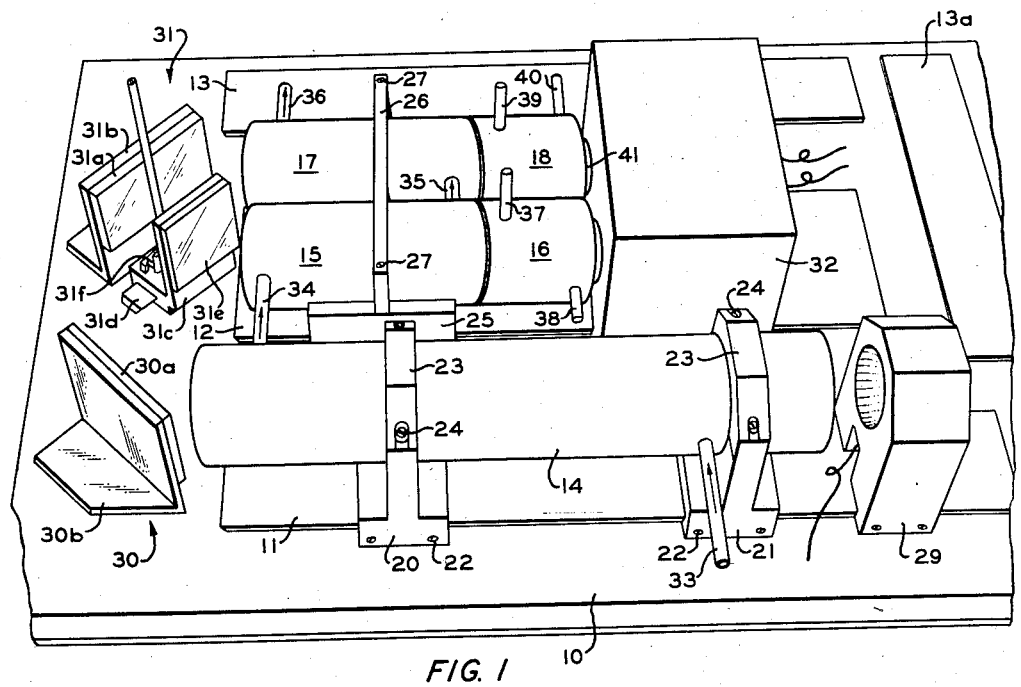
FIG. 1
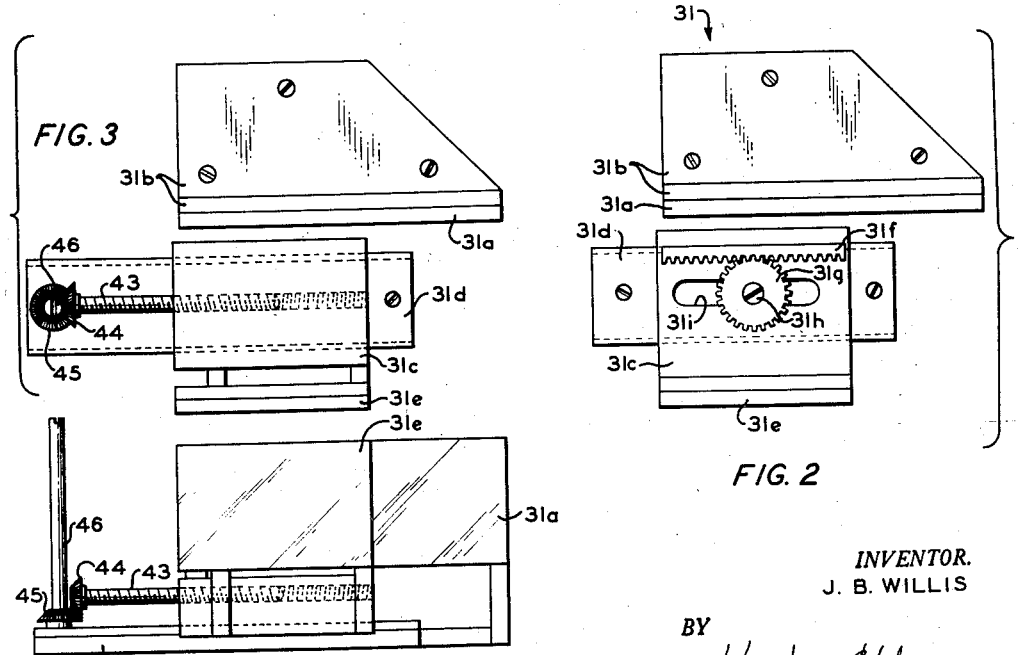
FIG. 3
FIG. 2
FIG. 4
INVENTOR.
J. B. WILLIS
BY
Hudson & Young
ATTORNEYS Dec. 2, 1958  J. B. WILLIS  2,863,060
COMPOSITION ANALYZER UTILIZING RADIATION
Filed June 20, 1955  3 Sheets-Sheet 2

INVENTOR.
J. B. WILLIS
BY
Hudson & Young
ATTORNEYS.

Dec. 2, 1958  J. B. WILLIS  2,863,060
COMPOSITION ANALYZER UTILIZING RADIATION
Filed June 20, 1955  3 Sheets-Sheet 3

INVENTOR.
J. B. WILLIS
BY
Hudson & Young
ATTORNEYS.

United States Patent Office 2,863,060
Patented Dec. 2, 1958

2,863,060

COMPOSITION ANALYZER UTILIZING RADIATION

Joseph B. Willis, Bartlesville, Okla., assignor to Phillips Petroleum Company, a corporation of Delaware Application June 20, 1955, Serial No. 516,406

11 Claims. (Cl. 250—43.5)

This invention relates to composition analyzers utilizing radiation. In another aspect, it relates to an infrared analyzer with a novel sample cell arrangement, and incorporating a trimmer device which divides the infrared radiation equally among a plurality of beams without loss of any radiant energy due to interception.

In many composition analyzers utilizing radiation, one beam of radiation passes through the sample to be tested while another beam of radiation passes either directly to a detector, or through appropriate filter media to said detector. In such instruments, it is oftentimes necessary to balance the quantity of radiation in the plurality of beams. Heretofore, this has been accomplished by providing a mechanical trimmer in the path of one or both beams. This is essentially a movable piece of opaque material, which can be shifted within the path of the beam, thereby intercepting a greater or lesser portion of the radiation, and thus permitting the total quantity of radiation in the beams to be balanced. Clearly, such an opaque trimmer absorbs or intercepts a certain proportion of the radiation so that there is a decrease in the total amount of radiation available for making the analysis.

In accordance with the present invention, a set of mirrors is provided, one of which directs the radiation into each of a plurality of separate radiation paths. At least one mirror of this set is movable so that the relative amounts of radiation in the two beams can be adjusted, and these mirrors are so arranged as to divide the total radiation into the different paths, as desired, without intercepting any of the radiation. Thus, the total energy of the infrared source is all utilized in making the analysis, and none of it is wasted as a result of being intercepted by an opaque trimmer. Another important feature of the invention resides in the utilization of a plurality of tracks or supports to which a number of cells can be attached in diversified arrangements. This permits various arrangements of sample and filter cells to be employed and, in particular, where a gaseous sample is to be analyzed, a quite long path for the radiation beam or beams through the sample can be readily provided. In still another aspect of the invention, a source of infrared radiation of novel character is provided which cooperates with the other elements of the instrument to provide an essentially collimated or parallel beam of radiation.

Accordingly, it is an object of the invention to provide an improved composition analyzer utilizing radiation.

It is a further object of the invention to provide a novel trimmer assembly for such instruments.

It is a further object of the invention to provide a very flexible cell supporting arrangement, whereby the instrument can be advantageously utilized for the analysis of gaseous materials.

It is a still further object to provide a source of infrared radiation of improved character.

Various other objects, advantages and features of the invention will become apparent from the following detailed description taken in conjunction with the accompanying drawings, in which:

Figure 1 is a perspective view of a composition analyzer constructed in accordance with the invention;

Figure 2 is a top view of one form of movable mirror assembly;

Figure 3 is a top view of a modified form of mirror assembly;

Figure 4 is a side elevational view of the assembly of Figure 3;

Figure 5:
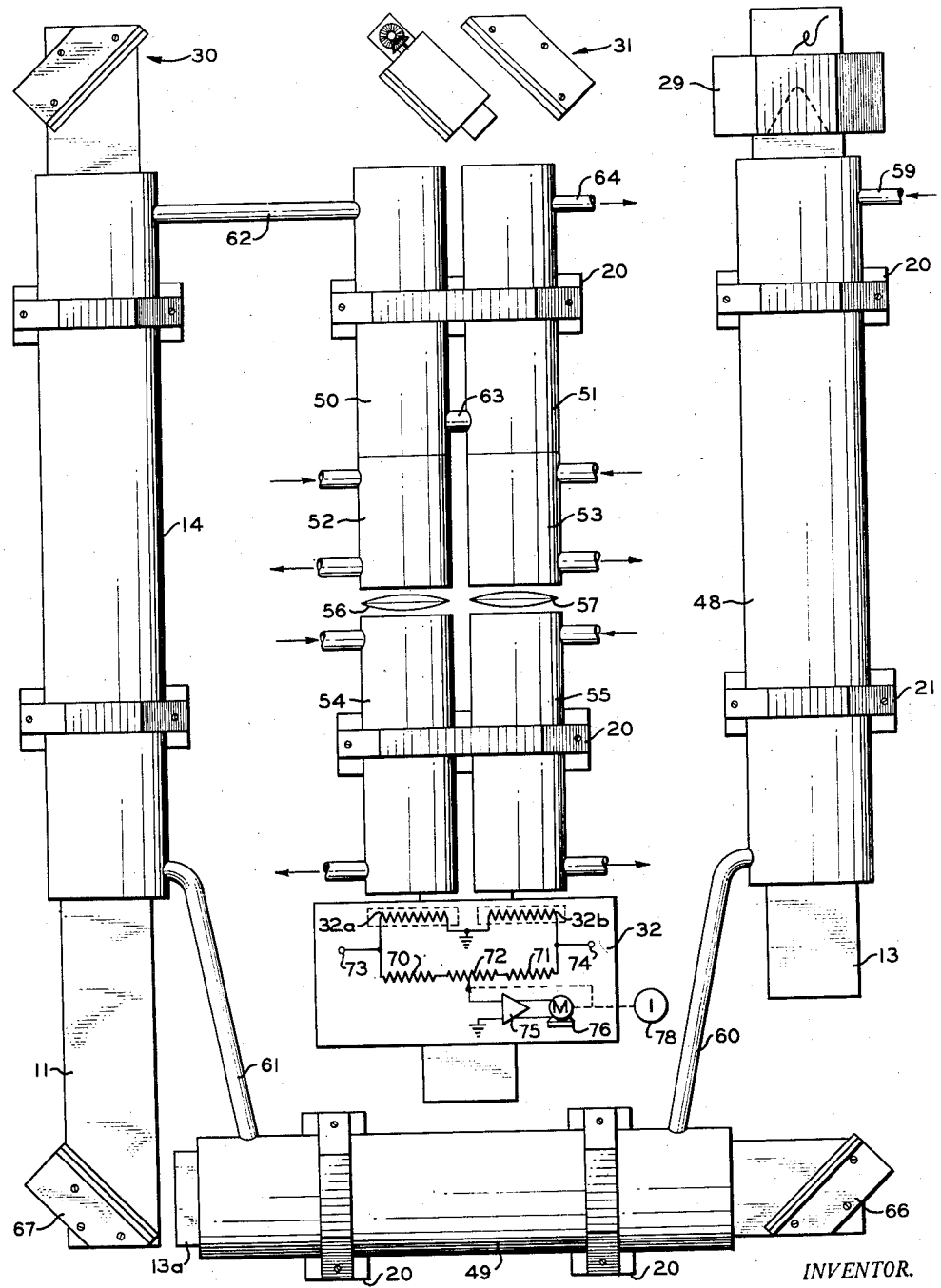
Figure 5 is a top view of a modified form of composition analyzer.

Referring now to Figure 1, I have shown a base 10 upon which is mounted a plurality of elongated flat plates or tracks 11, 12, 13 and 13a. An elongated cylindrical sample cell 14 is secured to the track 11, and two cell units are secured to the track 12. One unit includes a sample cell 15 and a filter cell 16 while the other cell unit includes a sample cell 17 and a filter cell 18. No cell units are attached to the tracks 13, or 13a, in the modification shown by Figure 1. However, in certain embodiments of the invention, suitable cells or cell assemblies can be secured to these tracks.

It will be noted that the cell 14 is received within a pair of brackets 20 and 21 which are slidable along the track 11, and can be secured in any suitable position thereon by set screws 22. Each bracket has a semi-circular recess formed therein which receives the cylindrical cell 14, and a fixture 23 is secured to each of the brackets 20 and 21, respectively, by screws 24 to hold the cell 14 rigidly in its assembled position upon the track 11. The cell sets 15, 16 and 17, 18 are secured to the track 12 by a larger bracket 25 having a suitable fixture 26 attached thereto, as by a plurality of bolts 27.

Also mounted on the track 11 is a radiation source 29 which produces a collimated beam of radiation. This beam passes through the cell 14, whence it is reflected by a stationary mirror assembly 30 and a dual mirror assembly 31 so that two beams are formed which pass the respective cell sets 15, 16 and 17, 18 to a twin detector unit 32 mounted upon the track 12. This detector unit can include a pair of bolometers or other suitable detectors of infrared radiation, and these bolometers or detectors can be connected in a bridge circuit, as exemplified by Figure 5, as those skilled in the art will readily understand.

In one specific embodiment of the invention, the instrument is utilized to measure the ethylene content, which varies between 0 and 10 percent, in a gaseous stream containing approximately 85 percent ethane and up to 10 percent propylene. In this embodiment, the cells 14, 15 and 17 are connected together and the sample is passed in series through these cells. To this end, the gaseous sample is introduced through an inlet 33 at one end of the cell 14, the sample traversing this cell and passing through an outlet 34 to one end of the cell 15, thence, through the cell 15, a conduit 35, and the cell 17 to an outlet conduit 36. Cell 16 has an inlet 37 and an outlet 38 while cell 18 has an inlet 39 and an outlet 40 so that suitable filter materials can be introduced into these cells as will become evident hereafter.

In the specific embodiment heretofore referred to, the cell 14 was 8 inches in length, the cells 15, 17 are 4 inches in length and the cells 16, 18 are two inches in length. The windows of the cells, which permit the radiation to pass therethrough, one of which is indicated by reference numeral 31, are formed from calcium fluoride. One filter cell 16 is filled with ethylene and the other filter cell 18 is filled with nitrogen. Thus, changes in the ethylene concentration affect the energy passing through one beam but not through the other beam, as the ethylene filter absorbs all radiation at the principal absorption bands of ethylene. Consequently, when the intensities or amounts of radiation in the two beams are compared or substracted from each other, the result is indicative of the amount of ethylene present in the sample.

In an alternative arrangement, the sample passes only through the cell 14, while both filter cells 15, 17 are filled with propylene and the filter cells 16, 18 are filled with nitrogen. One filter cell 16 has a quartz window and the other filter cell 18 has a sapphire window. In this manner, an equivalent result is obtained, as the sapphire has substantially the same absorption characteristics as the ethylene so that the ethylene produces an effect in one beam but not in the other. The function of the propylene in this arrangement is to remove any interference which might be caused by this component.

In analyzing a gaseous sample, it is oftentimes desirable that the path of the radiation through the material being tested be quite long. It will be understood that additional sample cells can be placed upon the tracks 13, 13a if desired, and the sample passed in series through these additional cells to provide a longer radiation path through the sample.

It will be noted that the radiation from source 29 passes as a single beam through the cell 14 and, thence, is reflected as a single beam by the stationary mirror assembly 30 which includes a flat gold-plated mirror 30a secured to a suitable mounting bracket 30b which is attached to the base 10.

The mirror assembly 31 includes a flat gold-plated mirror 31a of similar construction to the mirror 30a, this mirror being secured to a bracket 31b attached to the base 10. In accordance with the invention, there is provided a movable mirror which reflects a predetermined amount of the radiation through the cells 15, 16 to the detector unit, it being understood that the mirror 31a transmits the remainder of the radiation to the cells 17, 18 to the detector unit 32. This movable assembly, Figures 1 and 2, includes an L-shaped support 31c which is slidable along a guide or track 31d. The support 31c carries a mirror 31e which is about half as long as the mirror 31a. Moreover, the support 31c is provided with a rack 31f which meshes with a pinion 31g secured to a vertical upstanding adjusting rod or pin 31h. This pin is journaled in the base 31d, and fits within a slot 31i formed in the member 31c. Thus, rotation of the pin 31h causes longitudinal movement of the mirror 31e and its recording assembly along the track 31d.

Referring to Figures 1 and 2, it will be apparent that the mirror 31e intercepts a portion of the radiation which would otherwise fall upon the mirror 31a, and causes this intercepted portion to pass through the cells 15 and 16. Moreover, longitudinal movement of the mirror assembly 31c along the plate 31d varies the amount of radiation thus intercepted so that the amount of energy in the beams can be readily equalized. It will be further noted that all of the radiation not intercepted by the mirror 31e is reflected by the mirror 31a and passes through the cells 17 and 18 to the radiation detector unit. Thus, none of the radiation in the beam passing through the sample cell is lost, as would be the case if an opaque trimmer were used to balance the light or other radiation in the two beams. This provides a very significant increase in the sensitivity of the instrument, particularly where a gaseous sample is being analyzed, and the energy in the radiation beam must be utilized to the greatest possible advantage in order to obtain accurate results.

A modified form of trimming device is shown by Figures 3 and 4 wherein parts similar to those already described are indicated by like reference numerals. In this embodiment, a screw 43 is received within a threaded opening in the support 31c, and the end of this screw 43 protrudes from the support and has a pinion 44 attached thereto which meshes with a pinion 45 fixed to a vertically upstanding pin 46 which is suitably journaled in the base 10. This structure operates optically in the same manner as the structure of Figures 1 and 2, in that rotation of the pin 46 causes longitudinal movement of the support 31c and mirror 31e along the track 31d. However, the arrangement of Figures 3 and 4 is advantageous in many instances because the pin 46 is not in the path of the radiation, and can be manipulated without affecting the optical system of the instrument.

In Figure 5, as shown, a modification of the instrument wherein the additional tracks are utilized to provide additional cell length for the analysis of gaseous samples containing low concentrations of the component of interest. In this embodiment, sample cells 48 and 49 are mounted upon the respective tracks 13 and 13a, and the source 29 is secured at one end of the track 13. The cells 48, 49 have suitable radiation-transparent windows, not shown, and they are secured to the tracks by brackets 20 of similar construction to those described in connection with Figure 1. This embodiment also includes a pair of sample cells 50, 51, a pair of filter cells 52, 53, and a pair of filter cells 54, 55, which are secured to the base by suitable clamping brackets 20, similar to those described in connection with Figure 1. It will be noted that the cells 50, 52 and 54 are in optical alignment in one radiation beam while the cells 51, 53 and 55 are in optical alignment in the other radiation beam, there being a lens 56 between the cells 52 and 54 together with a lens 57 between these cells 53 and 55. The lenses 56, 57 focus the radiation beam upon the detectors 32a, 32b which are quite small.

In this modification, the sample passes, in succession, through an inlet 59, the cell 48, a conduit 60, the cell 49, a conduit 61, the cell 14, a conduit 62, the cell 50, a conduit 63, the cell 51 and an outlet conduit 64 so that a very long path is provided for passage of the radiation through the sample material.

The radiation from the source 29 passes through the cell 48, and is reflected by a mirror 66 whence the beam passes through the cell 49 and is reflected by a mirror 67 so that it passes through the cell 14, the mirror assembly 30, and the dual mirror assembly 31, as described in connection with Figure 1. This dual mirror assembly forms two beams which pass through the respective sets 50, 52, 54 and 51, 53, 55 of the cell units onto the respective bolometers or radiation detector units 32a and 32b of the detector unit 32.

It will be understood that various combinations of filter materials can be used in the filter cells. For example, in analyzing the ethylene-propylene-ethane stream previously discussed, the sample cells 52, 53 can be filled with propylene to remove interference from this component, the sample cell 54 can be filled with ethylene to sensitize the other beam to this component, and the sample cell 55 can be filled with air. The described arrangement produces a very sensitive analysis, and the concentration of components even in minute quantities can be readily detected due to the long path length of the radiation through the sample. Moreover, by the use of the tracks 11, 12 and 13 a very flexible arrangement is provided so that the cells can be readily shifted about as desired for various instrument applications.

The detector circuit is shown in more detail by Figure 5, and it will be noted that the bolometers or other radiation detector units are connected in a Wheatstone bridge circuit with balancing impedances 70, 71 having a potentiometer 72 connected therebetween. A suitable alternating current is applied between two opposite terminals of the bridge from supply terminals 73 and 74 while the other opposite terminals of the bridge are connected to an amplifier 75, the output of which is fed to a servomotor 76 mechanically connected to the shaft of potentiometer 72. By the action of the amplifier and servomotor, the bridge is maintained in continuous balance, and the position of the servomotor shaft, as recorded by an indicator 78 is indicative of the relative intensities of radiation from the two beams falling upon the bolometers 32a and 32b. If desired, automatic standardization of the instrument can be provided by adding to the bridge circuit shown the standardization system described and claimed in Hutchins Patent No. 2,579,825.

With the long cell length provided by Figure 5, the dual mirror assembly 31 is of special advantage in providing a system for equalizing the amounts of energy available in the two beams without wasting any of the energy of the beams, as would be done if the beam energies were equalized by an opaque trimmer. It will be evident, from the foregoing description, that the instrument is suitable not only for infrared analyzers but, in certain of its features, to analyzers utilizing other types of radiation, for example, ultraviolet radiation, visible light and the like, as, in any instrument employing a plurality of radiation beams, it is desirable to equalize the energy in the beams without losing a portion of this energy through interposition of an opaque trimmer.

Figure 6:
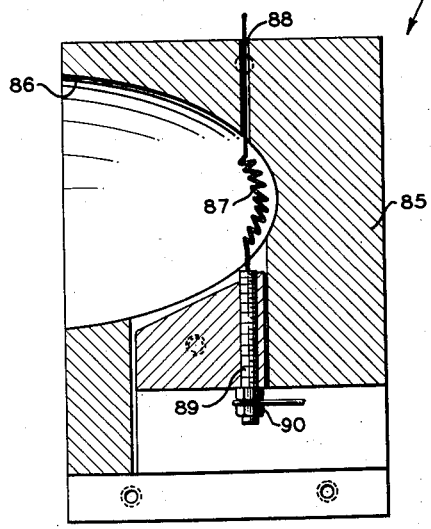
Figure 6 is a vertical sectional view of a radiation source.

Referring now to Figure 6, I have shown a suitable radiation source for operation of the described instruments. This unit includes a metal block 85 which is shaped to form an internal surface 86 having the configuration of a paraboloid. At the inner end of the surface 86 is disposed an elongated resistance coil 87 the end of which extends through an opening 88 formed in the block 85, the other end of the coil extending through an insulating sleeve 89 to a terminal 90. By virtue of the parabolic cross section of the surface 86, the energy of the source is effectively collimated in a substantially parallel radiation beam, which functions very effectively in combination with the other elements of the analyzer.

Figure 7:
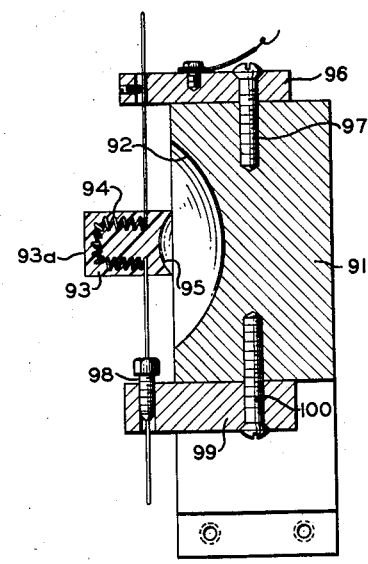
Figure 7 is a vertical sectional view of an improved radiation source.

In Figure 7, I have shown a modified radiation source, which is described more fully and claimed in the copending application of J. B. Willis and Dexter E. Smith, Serial No. 520,473, filed July 7, 1955, now Patent No. 2,827,539. This unit includes a block 91 shaped to form a surface 92 which is gold-plated and has the configuration of a paraboloid. A block of refractory cement 93 has a heating element 94 embedded therein, and this cement member has a hemispherical surface 95, positioned adjacent the surface 92. The center of the hemispherical surface 95 is positioned at the focus of the paraboloid-shaped surface 92. One terminal of the heating element 94 extends upwardly and is connected to a metal terminal strip 96, which, in turn, is attached to the block 91 by a bolt 97. The lower terminal of the heating element is received within a bushing 98 secured within a refractory rock or lava member 99 which is secured to the block 91 by a bolt 100.

The leads of the coil effectively support the heating element and the described position with respect to the paraboloid surface 92, and by virtue of the hemispherical nature of surface 95, the heat rays appear to emanate from a point source so that a truly parallel beam of radiation is produced by action of the device. Where the described combination of hemispherical and paraboloid surfaces is not utilized, there is considerably more scattering of the beam and the energy thereof is not concentrated as effectively as with the source of Figure 7. Finally, it will be noted that energy from the surface 93a of the source supplies radiation to the area which would otherwise be blacked out by member 93.

While the invention has been described in connection with present, preferred embodiments thereof, it is to be understood that this description is illustrative only and is not intended to limit the invention.

I claim:

1. In a radiation analyzer, in combination, a source of a beam of focused radiation, a first mirror arranged to intercept and reflect part of said radiation beam, a second mirror arranged to intercept and reflect the rest of said radiation beam, a pair of radiation detectors arranged to receive radiation reflected from the respective mirrors, means for placing a sample to be analyzed in the path of said radiation, means for sensitizing one of the reflected beams to changes in concentration of a selected component in said sample, and means for effecting relative movement between said mirrors to adjust the relative proportions of radiation present in the reflected beams.

2. In an infrared radiation analyzer, in combination, a source of focused infrared radiation, a first mirror arranged to intercept and reflect part of said infrared radiation, a second mirror arranged to intercept and reflect the rest of said infrared radiation, a pair of infrared radiation detectors arranged to receive infrared radiation reflected from the respective mirrors, means for placing a sample to be analyzed in the path of said infrared radiation, means for sensitizing one of the reflected beams to changes in concentration of a selected component in said sample, and means for effecting relative movement between said mirrors to adjust the relative proportions of infrared radiation present in the reflected beams.

3. In a composition analyzer utilizing radiation, in combination, a radiation source, a pair of mirrors arranged in parallel relationship in spaced planes, one mirror being disposed to receive a portion of a radiation beam from said source, and the other mirror being disposed to receive the rest of said radiation beam, a pair of detector units arranged to receive the respective radiation beams reflected by said mirrors, means for placing a sample to be analyzed in the path of said radiation, means to sensitize one beam to changes in concentration of a selected component in said sample, and means for moving one of said mirrors in its plane, thereby to vary the relative proportions of said radiation beam reflected by said mirrors.

4. In a composition analyzer utilizing radiation, in combination, a base, a radiation source mounted on said base producing a focused radiation beam, a flat mirror supported by said base and arranged to intercept and reflect a portion of said radiation beam, an elongated guide member secured to said base in parallel spaced relation to said mirror, a support movable along said guide member, a second mirror secured to said support and disposed in parallel spaced relationship to said first mirror, said second mirror being arranged to intercept and reflect the rest of the radiation in said beam, a sample cell secured to said base and disposed in the path of said radiation, filter means carried by said base and arranged in the path of the radiation reflected from one of said mirrors, a twin detector unit secured to said base and arranged to receive the respective beams of radiation reflected by said mirrors, and means for effecting movement of said support along said guide to vary the relative proportions of radiation in the beams reflected from said mirrors.

5. In a composition analyzer utilizing radiation, in combination, a base, a radiation source mounted on said base producing a focused radiation beam, a flat mirror supported by said base and arranged to intercept and reflect a portion of said radiation beam, an elongated guide member secured to said base in parallel spaced relation to said mirror, a support movable along said guide member, a second mirror secured to said support and disposed in parallel spaced relationship to said first mirror, said second mirror being arranged to intercept and reflect the rest of the radiation in said beam, a sample cell secured to said base and disposed in the path of said radiation, filter means carried by said base and arranged in the path of the radiation reflected from one of said mirrors, a twin detector unit secured to said base and arranged to receive the respective beams of radiation reflected by said mirrors, a rack secured to said support, an adjusting rod journaled in said base, a pinion fixed to said rod engaging said rack, whereby rotation of said adjusting rod moves said support and said second mirror along said guide to vary the relative proportions of radiation present in the beams reflected from said mirrors.

6. In a composition analyzer utilizing radiation, in combination, a base, a radiation source mounted on said base producing a focused radiation beam, a flat mirror supported by said base and arranged to intercept and reflect a portion of said radiation beam, an elongated guide member secured to said base in parallel spaced relation to said mirror, a support movable along said guide member, a second mirror secured to said support and disposed in parallel spaced relationship to said first mirror, said second mirror being arranged to intercept and reflect the rest of the radiation in said beam, a sample cell secured to said base and disposed in the path of said radiation, filter means carried by said base and arranged in the path of the radiation reflected from one of said mirrors, a twin detector unit secured to said base and arranged to receive the respective beams of radiation reflected by said mirrors, a threaded adjusting rod received within a tapped opening in said support and extending longitudinally of said guide, a pinion fixed to said rod, an adjusting member journaled in said base, a pinion secured to said member and meshing with the pinion fixed to said rod whereby rotation of said member moves said support longitudinally of said guide and causes said second mirror to vary the relative proportions of radiation present in the beams reflected from said mirrors.

7. In a composition analyzer utilizing radiation, in combination, a radiation source, a first elongated sample cell arranged to be traversed by radiation from said source, reflecting means arranged to divide the radiation passing through said cell into a plurality of separate beams, a twin detector unit arranged to receive the respective radiation beams and convert the radiant energy thereof into electrical energy, a second sample cell disposed in the path of one beam, a third sample cell disposed in the path of the other beam, means for flowing a gaseous sample serially through said sample cells, and a pair of filter cells disposed in the path of the respective radiation beams.

8. In a composition analyzer utilizing radiation, in combination, a base, a series of guide members secured to said base, a plurality of sample cells secured to the respective guide members, a radiation source secured to a guide member adjacent one end of the first sample cell and arranged to direct a radiation beam therethrough, reflecting means to pass said radiation in succession through the rest of said series of sample cells, reflecting means at the outlet of the last sample cell of said series arranged to divide the radiation into a plurality of radiation beams, a pair of radiation detectors arranged to receive said beams and convert the radiant energy thereof into electrical energy and a filter in the path of one of the said beams but not in the path of the other of said beams.

9. In a composition analyzer utilizing radiation, in combination, a base, a series of guide members secured to said base, a plurality of sample cells secured to the respective guide members, a radiation source secured to a guide member adjacent one end of the first sample cell and arranged to direct a radiation beam therethrough, reflecting means to pass said radiation in succession through the rest of said series of sample cells, reflecting means at the outlet of the last sample cell of said series arranged to divide the radiation into a plurality of radiation beams, a pair of radiation detectors arranged to receive said beams and convert the radiant energy thereof into electrical energy, a second sample cell arranged in the path of one beam, a third sample cell arranged in the path of the other beam, means for flowing a gaseous sample serially through all of said sample cells, and a pair of filter cells disposed in the paths of the respective radiation beams.

10. In a composition analyzer utilizing radiation, in combination, a radiation source, an elongated sample cell arranged to be traversed by radiation from said source, a stationary mirror arranged to receive and reflect a portion of the radiation leaving said sample cell, a second mirror disposed in spaced parallel relation to said first mirror and arranged to receive the rest of the radiation leaving said sample cell, a pair of radiation detectors arranged to receive the respective beams of radiation reflected by said mirrors, a pair of filter cells disposed in the paths of the respective radiation beams, and means for effecting relative movement between said mirrors while maintaining their spaced parallel relationship to vary the relative proportions of radiation in the reflected radiation beams.

11. The analyzer of claim 10 wherein said source is a source of infrared radiation, said detectors are bolometers, ethylene is included in one filter cell and nitrogen is incorporated in the other filter cell, said analyzer including means for flowing a gaseous ethylene-containing sample through said sample cell.

References Cited in the file of this patent

UNITED STATES PATENTS

| | | |
|---|---|---|
| 2,512,061 | Huck | June 20, 1950 |
| 2,658,984 | Mohn | Nov. 10, 1953 |
| 2,709,751 | Meyer | May 31, 1955 |
| 2,721,942 | Friel et al. | Oct. 25, 1955 |
| 2,737,591 | Wright | Mar. 6, 1956 |